Patented Dec. 15, 1953

2,662,888

UNITED STATES PATENT OFFICE 2,662,888

TERTIARY - AMINOALKYL 4-AMINO-2-BEN-
ZYLOXY - BENZOATES AND DEBENZYLA-
TION THEREOF

Raymond O. Clinton, North Greenbush, and
Stanley C. Laskowski, Menands, N. Y., assignors
to Sterling Drug Inc., New York, N. Y., a corporation of Delaware No Drawing. Original application June 17, 1950,
Serial No. 168,841. Divided and this application August 17, 1951, Serial No. 242,421

20 Claims. (Cl. 260—294.3)

This application relates to tertiary-aminoalkyl esters of 4-amino-2-hydroxybenzoic acid, to water-soluble acid-addition salts thereof, and to the preparation of these new compounds. In addition, it relates to tertiary-aminoalkyl esters of 4-amino-2-benzyloxybenzoic acid, to water-soluble acid-addition salts thereof, and to their preparation.

We have found that the basic esters of the general formula

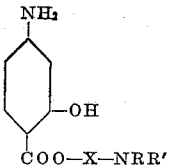

where X is a lower alkylene radical and NRR' is a lower aliphatic-like tertiary-amino radical, exhibit valuable pharmacological properties. These esters, preferably in their form of water-soluble acid-addition salts, have been found to possess outstanding local anesthetic activity.

In the above general formula, the lower alkylene radical represented by X has preferably 2-4 carbon atoms, and has its two free valence bonds on different carbon atoms. Thus X includes such examples as —CH₂CH₂—, —CH₂CH₂CH₂—,

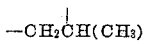

—CH₂CH₂CH₂CH₂—, —CH₂CH(CH₃)CH₂—, and the like. The lower aliphatic-like tertiary-amino radical shown above as NRR' comprehends lower dialkylamino radicals where R and R' are lower alkyl groups, alike or different, and each alkyl group having preferably 1-6 carbon atoms, such dialkylamino radicals including dimethylamino, diethylamino, ethylmethylamino, diisopropylamino, di-n-butylamino, di-n-hexylamino and the like. Further, the lower aliphatic-like tertiary-amino radical designated as NRR' encompasses those radicals where R and R' are joined directly or through an oxygen atom to form saturated N-heteromonocyclic radicals having 5-6 ring atoms, illustrated by examples such as 1-piperidyl, 2-methyl - 1 - piperidyl, 3-ethyl-1-piperidyl, 4-methyl-1-piperidyl, 2,6-dimethyl-1-piperidyl, 1-pyrrolidyl, 2-methyl-1-pyrrolidyl, 2,5-dimethyl-1-pyrrolidyl, 4-morpholinyl, and the like.

The above basic esters are prepared by esterifying 4-nitro-2-hydroxybenzoic acid to produce the tertiary-aminoalkyl 4-nitro-2-hydroxybenzoate having the formula

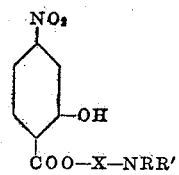

where X and NRR' have the meanings given hereinabove, and reducing said basic 4-nitro-2-hydroxybenzoate to the corresponding tertiary-aminoalkyl 4-amino-2-hydroxybenzoate. A specific illustration of this procedure is the formation of 2-dimethylaminoethyl 4-amino-2-hydroxybenzoate by esterifying 4-nitro-2-hydroxybenzoic acid to produce 2-dimethylaminoethyl 4-nitro-2-hydroxybenzoate and reducing the latter to form 2-dimethylaminoethyl 4-amino-2-hydroxybenzoate. We carried out the esterification of 4-nitro-2-hydroxybenzoic acid to produce the corresponding tertiary-aminoalkyl ester in various ways. In one procedure, the 4-nitro-2-hydroxybenzoic acid was reacted with a tertiary-aminoalkyl halide. In another procedure, a lower alkyl 4-nitro-2-hydroxybenzoate was transesterified with a tertiary-aminoalkanol. In still another procedure, the 4-nitro-2-hydroxybenzoic acid was first treated with a haloalkanol to produce a haloalkyl ester which was reacted with a secondary amine to yield the desired tertiary-aminoalkyl ester. Thus, in the above specific illustration, 2-dimethylaminoethyl 4-nitro-2-hydroxybenzoate is prepared by reacting 4-nitro-2-hydroxybenzoic acid with 2-dimethylaminoethyl chloride; by reacting methyl 4-nitro-2-hydroxybenzoate with 2-dimethylaminoethanol; or by first reacting 4 - nitro - 2 - hydroxybenzoic acid with ethylene chlorohydrin and treating the resulting 2-chloroethyl 4-nitro-2-hydroxybenzoate with dimethylamine.

The reduction of the tertiary-aminoalkyl 4-nitro-2-hydroxybenzoates to the corresponding 4-amino-2-hydroxybenzoates was carried out both by chemical methods and by catalytic hydrogenation. Suitable chemical reducing agents include iron and hydrochloric acid, ferrous sulfate and ammonia, tin and hydrochloric acid, sodium hydrosulfite, etc. Catalysts suitable when catalytic hydrogenation is used include Raney nickel, platinum, palladium, or other catalysts generally effective to catalyze hydrogenation of nitro groups to amino groups.

Our tertiary-aminoalkyl 4-amino-2-hydroxybenzoates are therapeutically active whether employed as the free bases or as their salts with relatively non-toxic organic or inorganic acids. We found it convenient to isolate the basic esters as their hydrochlorides or phosphates. However, other acid-addition salts are within the scope of our invention. Such additional salts include the hydrobromides, sulfates, citrates, sulfamates, tartrates, succinates, acetates, benzoates, oleates, and the like.

Specific embodiments of our invention are illustrated in the following paragraphs:

1. *Tertiary-aminoalkyl 4-nitro-2-hydroxybenzoates*

These basic esters were prepared from 4-nitro-2-hydroxybenzoic acid by the following esterification variants: by the reaction of 4-nitro-2-hydroxybenzoic acid with a tertiary-aminoalkyl halide; by the reaction of a lower alkyl 4-nitro-2-hydroxybenzoate with a tertiary-aminoalkanol; or by the reaction of 4-nitro-2-hydroxybenzoic acid with a haloalkanol followed by treatment of the resulting haloalkyl ester with a secondary amine.

The first variant is illustrated by the following preparation of 2-diethylaminoethyl 4-nitro-2-hydroxybenzoate hydrochloride: To a stirred, refluxing solution of 137.5 g. of 4-nitro-2-hydroxybenzoic acid in 800 ml. of isopropanol was added dropwise 110 g. of 2-diethylaminoethyl chloride during the course of one and one-half hours. The resulting heterogeneous mixture was stirred and refluxed for an additional seven hours, cooled, and the dense white precipitate was collected. The filtrate was evaporated to dryness in vacuo and the resulting residue was triturated with acetone. The acetone-insoluble material was combined with the original precipitate and the material was recrystallized several times from ethanol in the presence of a small amount of anhydrous hydrogen chloride. There was obtained 161.4 g. (67.7%) of 2-diethylaminoethyl 4-nitro-2-hydroxybenzoate hydrochloride, M. P. 179.6–180.4° C. (corr.), crystallizing in white needles.

The second procedure of reacting a lower alkyl 4-nitro-2-hydroxybenzoate with a tertiary-aminoalkanol is illustrated by the following preparation of 3-(2-methyl-1-piperidyl)propyl 4-nitro-2-hydroxybenzoate hydrochloride: A mixture of 84.5 g. of ethyl 2-hydroxy-4-nitrobenzoate, 70.8 g. of 3-(2-methyl-1-piperidyl)propanol, 700 ml. of dry toluene and 200 mg. of sodium methoxide was slowly distilled through an efficient fractionating column. The evolution of ethanol was slow, requiring forty-eight hours for completion. The residue was evaporated in vacuo and the resulting viscous oil was dissolved in ethyl acetate and treated with an excess of ethereal hydrogen chloride. The resulting thick heavy oil was separated by decantation and dissolved in dry acetone. On scratching and cooling this solution a dense white precipitate appeared. Several recrystallizations from isopropanol gave 55.7 g. (39%) of 3-(2-methyl-1-piperidyl)propyl 4-nitro-2-hydroxybenzoate hydrochloride, crystallizing in needles, M. P. 173.0–173.8° C. (corr.).

The third variant for preparing the tertiary-aminoalkyl 4-nitro-2-hydroxybenzoates is illustrated as follows: A mixture of one mole of 4-nitro-2-hydroxybenzoic acid and three moles of ethylene chlorohydrin was heated to reflux and dry hydrogen chloride was passed into the reaction mixture for eight hours. The excess ethylene chlorohydrin was removed by distilling in vacuo and the residue when crystallized from absolute ethanol yielded 2-chloroethyl 4-nitro-2-hydroxybenzoate, M. P. 87.4–88.4° C. (corr.). The corresponding 2-bromoethyl ester, M. P. 74.7–74.9° C. (corr.), resulted when ethylene bromohydrin was used in place of ethylene chlorohydrin. A mixture of one mole of 2-chloroethyl (or 2-bromoethyl) 4-nitro-2-hydroxybenzoate and two moles of diethylamine and 1500 ml. of toluene was refluxed for twenty-four hours. After removal of the solvent by distilling in vacuo, the residue was dissolved in hydrochloric acid, the acidic solution was treated with decolorizing charcoal and filtered. The filtrate was made alkaline with potassium carbonate and the mixture was extracted with ethyl acetate. After removal of the ethyl acetate by distilling in vacuo, the residue was dissolved in absolute ethanol and the alcoholic solution was treated with excess hydrogen chloride in ether. Addition of excess ether precipitated the basic ester salt, 2-diethylaminoethyl 4-nitro-2-hydroxy-benzoate hydrochloride, which was recrystallized from isopropanol.

Other tertiary-aminoalkyl 4-nitro-2-hydroxybenzoate hydrochlorides prepared according to the foregoing procedures include those given in Table A.

TABLE A

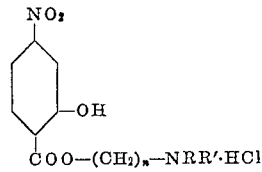

| $n$ | NRR′ | M.P./°C. (corr.) |
| --- | --- | --- |
| 2 | N(CH$_3$)$_2$ | 174.0–175.0 |
| 2 | NC$_5$H$_{10}$[a] | 183.8–184.8 |
| 2 | NC$_6$H$_{12}$[b] | 181.5–182.2 |
| 2 | NC$_7$H$_{14}$[c] | 181.5–182.1 |
| 2 | NC$_6$H$_{12}$[b] | 183.0–184.0 |
| 3 | NC$_4$H$_8$O[d] | 195.2–197.6 |
| 2 | NC$_4$H$_8$O[d] | 210.0–210.6 |

[a] NC$_5$H$_{10}$=1-piperidyl.
[b] NC$_6$H$_{12}$=2-methyl-1-piperidyl.
[c] NC$_7$H$_{14}$=2,6-dimethyl-1-piperidyl.
[d] NC$_4$H$_8$O=4-morpholinyl.

Additional tertiary-aminoalkyl 4-nitro-2-hydroxybenzoate hydrochlorides which can be prepared according to the above procedures include the following: 4-dimethylaminobutyl 4-nitro-2-hydroxybenzoate hydrochloride; 3-dimethylamino-2-propyl 4-nitro-2-hydroxybenzoate hydrochloride; 2-di-n-butylaminoethyl 4-nitro-2-hydroxybenzoate hydrochloride; 2-(1-pyrrolidyl)ethyl 4-nitro-2-hydroxybenzoate hydrochloride; 3-(2-methyl-1-pyrrolidyl)propyl 4-nitro-2-hydroxybenzoate hydrochloride; and 2-(2,5-dimethyl-1-pyrrolidyl)ethyl 4-nitro-2-hydroxybenzoate hydrochloride.

The corresponding free bases of the foregoing salts, i. e., the tertiary-aminoalkyl 4-nitro-2-hydroxybenzoates, are highly-colored, high melting solids soluble in polar solvents such as water, methanol, ethanol, etc. and insoluble in nonpolar solvents. They probably have the structure of inner salts, with the formula

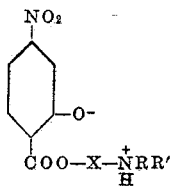

2. *Tertiary-aminoalkyl 4-amino-2-hydroxybenzoates*

These esters are prepared by reducing the hereinabove described tertiary-aminoalkyl 4-nitro-2-hydroxybenzoates. This reduction is carried out either by chemical means or by catalytic hydrogenation methods.

Exemplary of the chemical method is the following preparation of 2-(2,6-dimethyl-1-piperidyl)ethyl 4-amino-2-hydroxybenzoate: To a stirred boiling mixture of 90 g. of iron powder, 200 ml. of water, 300 ml. of ethanol and 1 ml. of concentrated hydrochloric acid was gradually added in portions 80.7 g. of 2-(2,6-dimethyl-1-piperidyl)ethyl 2-hydroxy-4-nitrobenzoate hydrochloride. Each addition produced an exothermic reaction. When the addition had been completed, the mixture was stirred at the boiling point for twenty minutes. While continuing stirring and heating, 30 to 40 g. of solid sodium bicarbonate was cautiously added, and the resulting mixture was stirred and heated an additional ten minutes. The mixture was filtered hot and the filter cake washed well with hot ethanol. The combined filtrates were concentrated in vacuo until all ethanol was removed. The residual aqueous suspension of the crystalline base was cooled and filtered, and the precipitate was washed well with cold water. The precipitate crystallized from n-heptane in rosettes of beautiful long slender needles of 2-(2,6-dimethyl-1-piperidyl)-ethyl 4-amino-2-hydroxybenzoate, M. P. 111.0–111.6° C. (corr.). The phosphate of this basic ester was prepared from mole equivalents of base and phosphoric acid ($H_3PO_4$) in absolute ethanol and recrystallized by dissolving in a minimum amount of hot water, filtering and slowly diluting with hot absolute ethanol. The resulting salt, 2-(2,6-dimethyl-1-piperidyl)ethyl 4-amino-2-hydroxybenzoate phosphate, melts at 197.7–200.0° C. (corr.).

A specific illustration of the catalytic hydrogenation method of preparing our tertiary-aminoalkyl 4-amino-2-hydroxybenzoates is the following synthesis of 3-(1-piperidyl)propyl 4-amino-2-hydroxybenzoate: A mixture of 10.0 g. of 3-(1-piperidyl)propyl 4-nitro-2-hydroxybenzoate hydrochloride, 500 mg. of platinum oxide and 150 ml. of 50% aqueous ethanol was hydrogenated in a Parr-Burgess hydrogenator at 25–45° C. and 20–50 lbs. pressure. The theoretical amount of hydrogen was absorbed in fifteen to twenty minutes. The mixture was filtered and evaporated to dryness in vacuo. The residual white solid was crystallized from ethanol to give a high yield of 3-(1-piperidyl)propyl 4-amino-2-hydroxybenzoate hydrochloride, M. P. 239.5–240.2° C. (corr.). The phosphate salt of this basic ester was prepared as follows: 3-(1-piperidyl)propyl 4-amino-2-hydroxybenzoate hydrochloride, M. P. 239.5–240.2° C. (corr.). The phosphate salt of this basic ester was prepared as follows: 3-(1-piperidyl)propyl 4-amino-2-hydroxybenzoate hydrochloride was converted to the crystalline base by treatment of an aqueous solution thereof with an excess of sodium carbonate solution. The resulting base when treated with a one mole proportion of 85% phosphoric acid in absolute alcohol solution readily yielded 3-(1-piperidyl)propyl 4-amino-2-hydroxybenzoate phosphate, forming rosettes of large blunt needles from 95% ethanol, M. P. 204.7–205.0° C. (dec.) (corr.).

Other tertiary-aminoalkyl 4-amino-2-hydroxybenzoates prepared according to the above procedures include those given in Table B.

TABLE B

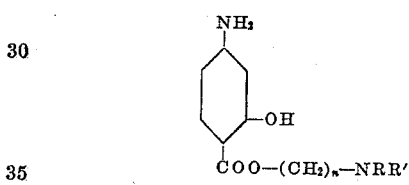

| $n$ | NRR' | M. P./°C. (corr.) Base | M. P./°C. (corr.) Phosphate |
|---|---|---|---|
| 2 | $N(CH_3)_2$ | 136.1–137.2 | e,f 219.7–220.0 |
| 2 | $N(C_2H_5)_2$ | oil | g 154.0–154.8 |
| 2 | $NC_5H_{10}$ a | 79.0–80.6 | e 223.5–223.8 |
| 2 | $NC_6H_{12}$ b | 60.0–62.0 | 203.5–204.0 |
| 3 | $N(CH_3)_2$ | oil | e 209.6–210.7 |
| (c) | $N(CH_3)_2$ | 111.6–113.2 | a 203.2–204.2 |
| 3 | $NC_6H_{12}$ b | oil | 201.0–201.5 |
| 2 | $NC_4H_8O$ d | 64.2–65.6 h | 200.7–201.2 |
| 3 | $NC_4H_8O$ d | 146.4 | 185.2–186.7 |
| 3 | $N(C_2H_5)_2$ | oil | e 212.3 | a $NC_5H_{10}$=1-piperidyl.
b $NC_6H_{12}$=2-methyl-1-piperidyl.
c Tertiary-aminoalkyl is —$CH(CH_3)CH_2N(CH_3)_2$ or 3-dimethylamino-2-propyl.
d $NC_4H_8O$=4-morpholinyl.
e With decomposition.
f Monohydrochloride melts at 225.0–225.5° C. (corr.).
g Monohydrochloride.
h Crystallized from dilute ethanol as the monohydrate, M. P. 87–90° C.

Additional tertiary-aminoalkyl 4-amino-2-hydroxybenzoates which can be prepared according to the above procedures include the following: 4-dimethylaminobutyl 4-amino-2-hydroxybenzoate; 2-di-n-butylaminoethyl 4-amino-2-hydroxybenzoate; 2-(1-pyrrolidyl)ethyl 4-amino-2-hydroxybenzoate; 3-(2-methyl-1-pyrrolidyl)propyl 4-amino-2-hydroxybenzoate; and 2-(2,5-dimethyl-1-pyrrolidyl)ethyl 4-amino-2-hydroxybenzoate.

The foregoing tertiary-aminoalkyl 4-amino-2-hydroxybenzoates are also conveniently prepared from 4-nitro-2-hydroxybenzoic acid or its lower alkyl esters through the 2-benzyloxy derivatives according to the steps illustrated in the following equations, wherein R'' is a lower alkyl group and X and NRR' have the meanings given hereinabove:

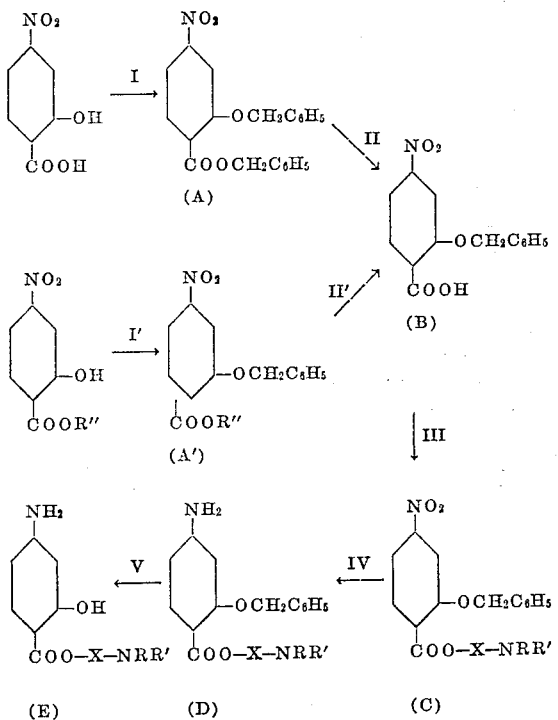

Thus, 4-nitro-2-benzyloxybenzoic acid (B) is prepared either by benzylating 4-nitro-2-hydroxybenzoic acid (Step I) to form benzyl 4-nitro-2-benzyloxybenzoate (A), which is saponified in Step II to yield the desired 4-nitro-2-benzyloxybenzoic acid or by benzylating a lower alkyl 4-nitro-2-hydroxybenzoate (Step I') to form a lower alkyl 4-nitro-2-benzyloxybenzoate (A'), which in Step II' is saponified to the desired acid (B). 4-nitro-2-benzyloxybenzoic acid is then esterified in Step III to produce the corresponding tertiary-aminoalkyl 4-nitro-2-benzyloxybenzoate (C) which in Step IV is reduced to the corresponding tertiary-aminoalkyl 4-amino-2-benzyloxybenzoate (D). Then, in Step V, the tertiary-aminoalkyl 4-amino-2-hydroxybenzoate (E) is produced by catalytically debenzylating the basic 4-amino-2-benzyloxybenzoate (D). Steps IV and V can be carried out in the same reaction vessel without isolating compound D when the reduction is carried out catalytically, e. g., as with palladium on charcoal. As a specific illustration of Steps III, IV and V, 4-nitro-2-benzyloxybenzoic acid is esterified to produce 3-(2-methyl-1-piperidyl)propyl 4-nitro-2-benzyloxybenzoate which is then reduced to the corresponding 3-(2-methyl-1-piperidyl)propyl 4-amino-2-benzyloxybenzoate, which, in turn, is reduced to 3-(2-methyl-1-piperidyl)propyl 4-amino-2-hydroxybenzoate.

We carried out esterification Step III by two variants: in one, the 4-nitro-2-benzyloxybenzoic acid was reacted with a tertiary-aminoalkyl halide; and in the other, said acid was first converted into the corresponding acid chloride which was then treated with a tertiary-aminoalkanol. The reduction Step IV was carried out both by chemical methods and by catalytic hydrogenation. Suitable chemical reducing agents include iron and hydrochloric acid, ferrous sulfate, tin and hydrochloric acid, etc. We found iron and hydrochloric acid was to be preferred. Catalysts suitable when catalytic hydrogenation was employed include Raney nickel, platinum, palladium, etc. Reduction Step V was carried out by catalytic hydrogenation, using preferably palladium, although platinum and Raney nickel can be used, the latter at higher temperatures and pressures.

The tertiary-aminoalkyl 4-amino-2-benzyloxybenzoates are useful not only as intermediates in the preparation of the corresponding 2-hydroxy esters but also as local anesthetics in their own right. The tertiary-aminoalkyl 4-amino-2-benzyloxybenzoates are therapeutically active whether employed as the free bases or as their salts with relatively non-toxic organic or inorganic acids. We found it convenient to isolate the basic 2-benzyloxy esters as their phosphates or hydrochlorides. However, other acid-addition salts are within the scope of our invention. Such additional salts include the hydrobromides, sulfates, citrates, sulfamates, tartrates, succinates, acetates, benzoates, oleates, and the like.

Specific embodiments of our invention are illustrated in the following paragraphs.

3. 4-nitro-2-benzyloxybenzoic acid

This acid was prepared from 4-nitro-2-hydroxybenzoic acid through benzyl 4-nitro-2-benzyloxybenzoate and also from a lower alkyl 4-nitro-2-hydroxybenzoate through a lower alkyl 4-nitro-2-benzyloxybenzoate. Either preparation can be carried out without the isolation of the intermediate ester.

Illustrative of the procedure using a lower alkyl 4-nitro-2-hydroxybenzoate is the following where ethyl 4-nitro-2-hydroxybenzoate is utilized: A mixture of 84.4 g. of ethyl 4-nitro-2-hydroxybenzoate, 55.6 g. of benzyl chloride, 29.6 g. of anhydrous sodium carbonate, 6.8 g. of potassium iodide, 400 ml. of ethanol and 2 ml. of water was refluxed and stirred for eight hours. To isolate the ethyl 4-nitro-2-benzyloxybenzoate the mixture was filtered hot and the insoluble material was washed with hot ethanol. The combined filtrates were concentrated to dryness in vacuo and the residue was extracted exhaustively with hot n-hexane. When cooled the extracts yielded 105.1 g. (87%) of ethyl 4-nitro-2-benzyloxybenzoate crystallizing in long rods from n-hexane, M. P. 57.0–58.5° C. (corr.). When it was not desired to isolate the intermediate ethyl 4-nitro-2-benzyloxybenzoate, to the above hot mixture (after the reflux period of eight hours) was added 400 ml. of water and 85 g. of anhydrous sodium carbonate, and refluxing and stirring were continued for an additional five hours. The mixture was then filtered while hot and the precipitate, after washing well with hot ethanol, was discarded. The combined filtrates were concentrated in vacuo to remove the ethanol and the remaining aqueous solution was acidified to Congo red with hydrochloric acid. The resulting white precipitate was filtered off, washed well with water and recrystallized twice from isopropanol, giving a 95% yield of 4-nitro-2-benzyloxybenzoate as short, thick, pale yellow needles, M. P. 171–172° C. Comparable yields are obtained when other lower alkyl 4-nitro-2-hydroxybenzoates, including the methyl, n-propyl and isobutyl esters, are used in place of ethyl 4-nitro-2-hydroxybenzoate.

When the above procedure was carried out, substituting 4-nitro-2-hydroxybenzoic acid for ethyl 4-nitro-2-hydroxybenzoate and by using twice the amount of benzyl chloride and of sodium carbonate the intermediate benzyl 4-nitro-2-benzyloxybenzoate was obtained as small white needles from isopropanol, M. P. 96.5–98° C. (corr.). Saponification of this benzyl ester yielded the desired 4-nitro-2-benzyloxybenzoic acid.

4. Tertiary-aminoalkyl 4-nitro-2-benzyloxybenzoates

In practicing our invention we prepared these basic esters by two procedures: one, by reacting a 4-nitro-2-benzyloxybenzoyl halide with a tertiary-aminoalkanol; and the other, by reacting a tertiary-aminoalkyl halide with 4-nitro-2-benzyloxybenzoic acid in an appropriate solvent. The former procedure is illustrated by the following synthesis of 2-dimethylaminoethyl 4-nitro-2-benzyloxybenzoate: To a stirred cool mixture of 43.1 g. of pure pyridine, 64.5 g. of pure thionyl chloride and 1000 ml. of dry benzene, was added 148.9 g. of powdered, dry 4-nitro-2-benzyloxybenzoic acid in four equal portions over a period of twenty minutes. The heterogeneous mixture was then heated to 60° C. and allowed to stand for one and one-half hours at room temperature. Then, with cooling, there was added to this solution of 4-nitro-2-benzyloxybenzoyl chloride, 48.5 g. of redistilled 2-dimethylaminoethanol. After cooling, the precipitated crystals were collected and recrystallized from absolute ethanol-ethyl acetate, yielding 2-dimethylaminoethyl 4-nitro-2-benzyloxybenzoate hydrochloride, M. P. 180.2–181.3° C. (corr.). The free basic ester, 2-dimethylaminoethyl 4-nitro-2-benzyloxybenzoate, obtained by treatment of the above hydrochloride with potassium carbonate, crystallized from dilute ethanol in pale yellow prisms, M. P. 60.0–60.7° C. (corr.).

The above 4-nitro-2-benzyloxybenzoyl chloride is a yellow solid and may be isolated before treatment with the tertiary-aminoalkanol.

The other procedure we utilized in preparing the tertiary-amino-alkyl 4-nitro-2-benzyloxybenzoates, namely, the reaction of 4-nitro-2-benzyloxybenzoic acid with a tertiary-aminoalkyl halide, is illustrated by the following preparation of 3-(1-piperidyl) propyl 4-nitro-2-benzyloxybenzoate: A mixture of 54.6 g. of 4-nitro-2-benzyloxybenzoic acid, 38.8 g. of 3-(1-piperidyl) propyl chloride and 600 ml. of isopropanol was refluxed for twenty hours. The clear yellow-orange solution was then taken to dryness in vacuo and the residue was taken up in water. The aqueous solution was made basic with potassium carbonate and extracted with ethyl acetate. After drying the extract, the ethyl acetate was removed in vacuo leaving a crystalline residue which when recrystallized from dilute ethanol, yielded 3-(1-piperidyl)propyl 4-nitro-2-benzyloxybenzoate, M. P. 77.7–78.6° C. (corr.). The hydrochloride of this basic ester, which was prepared by treating a solution of the ester in ethanol with a solution of hydrogen chloride in ether, melts at 161.4–162.5° C. (corr.), when recrystallized from dilute ethanol.

Additional tertiary-aminoalkyl 4-nitro-2-benzyloxybenzoates, in the form of their hydrochlorides, prepared according to the above described procedures are given in Table C.

TABLE C

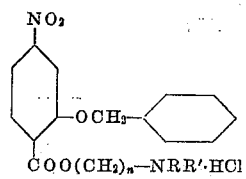

COO(CH$_2$)$_n$—NRR'·HCl

| n | NRR' | M. P./°C. (corr.) |
|---|---|---|
| (a) | N(CH$_3$)$_2$ | d 158.2–159.4 |
| 3 | N(CH$_3$)$_2$ | c 163.6–164.1 |
| 3 | N(C$_2$H$_5$)$_2$ | d 133.9–134.7 |
| 2 | N(C$_2$H$_5$)$_2$ | d 181.0–181.8 |
| 2 | NC$_6$H$_{12}$b | d 184.4–185.0 | a Tertiary-aminoalkyl is —CH(CH$_3$)CH$_2$N(CH$_3$)$_2$ or 3-dimethylamino-2-propyl.
b NC$_6$H$_{12}$=2-methyl-1-piperidyl.
c M. P. of free base is 57.8–59.0° C. (corr.).
d Free base is an oil.

Additional tertiary-aminoalkyl 4-nitro-2-benzyloxybenzoates which can be prepared according to the above procedures include the following: 4-dimethylaminobutyl 4-nitro-2-benzyloxybenzoate; 2-di-n-butylaminoethyl 4-nitro-2-benzyloxybenzoate; 2-(1-pyrrolidyl) ethyl 4-nitro-2-benzyloxybenzoate; 3-(2-methyl-1-pyrrolidyl)-propyl 4-nitro-2-benzyloxybenzoate; and 2-(2,5-dimethyl-1-pyrrolidyl) ethyl 4-nitro-2-benzyloxybenzoate.

5. Tertiary-aminoalkyl 4-amino-2-benzyloxybenzoates

Illustrative of the preferred procedure for preparing these basic esters is the following preparation of 2-dimethylaminoethyl 4-amino-2-benzyloxybenzoate: To a vigorously stirred, boiling mixture of 140 g. of powdered iron, 500 ml. of ethanol, 300 ml. of water and 1 ml. of concentrated hydrochloric acid was gradually added 156.3 g. of 2-dimethylaminoethyl 4-nitro-2-benzyloxybenzoate hydrochloride. When the addition had been completed, the mixture was stirred at the boiling point for twenty minutes, treated slowly with 40 g. of solid sodium bicarbonate, and stirred at the boiling point for an additional ten minutes. The mixture was filtered while hot and the insoluble material was washed well with hot ethanol. The ethanol was removed from the combined filtrates in vacuo and the residual oil was taken up in ethyl acetate. After drying, and decolorizing the solution with activated carbon, the ethyl acetate was removed in vacuo. The residual 2-dimethylaminoethyl 4-amino-2-benzyloxybenzoate crystallized from a benzene-n-hexane mixture in flat white needles, M. P. 84.5–86.0° C. (corr.). From the base the following salts were prepared by neutralization with the appropriate acid: 2-dimethylaminoethyl 4-amino-2-benzyloxybenzoate phosphate, M. P. 135.5–137.5° C. (corr.) and 2-dimethylaminoethyl 4-amino-2-benzyloxybenzoate dihydrochloride, M. P. 169.6° C. (corr.) (dec.).

Alternatively, the nitro group can be reduced to the amino group without effecting debenzylation by catalytic hydrogenation of the base in ethanol solution using Raney nickel (but not palladium or platinum) as catalyst, and at low pressures and temperature (25 lbs., 25° C.).

Additional tertiary-aminoalkyl 4-amino-2-benzyloxybenzoates, in the form of their phosphates or hydrochlorides, prepared according to the above procedure are given in Table D.

TABLE D

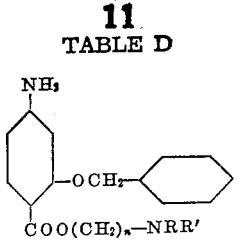

| $n$ | NRR' | M. P./°C. (corr.) Base | Salt |
|---|---|---|---|
| 3 | N(CH₃)₂ | 76.0–77.0 | d 150.0–154.0 |
| (ª) | N(CH₃)₂ | 103.0–103.8 | d 151.0–155.0 |
| 3 | NC₅H₁₀ᵇ | 103.0–104.0 | d 117.0–121.0 |
| 3 | N(C₂H₅)₂ | 85.4–86.4 | e 166.5–167.5 |
| 3 | N(C₂H₅)₂ | 86.2–87.6 | f 125.4–126.2 |
| 2 | NC₆H₁₂ᶜ | 97.8–99.2 | |

ª Tertiary-aminoalkyl is —CH(CH₃)CH₂N(CH₃)₂ or 3 dimethyl-amino-2-propyl.
ᵇ NC₅H₁₀=1-piperidyl.
ᶜ NC₆H₁₂=2-methyl-1-piperidyl.
d Phosphate.
e Dihydrochloride.
f Monohydrochloride.

Additional tertiary-aminoalkyl 4-amino-2-benzyloxybenzoates which can be prepared according to the foregoing procedure include the following: 4-dimethylaminobutyl 4-amino-2-benzyloxybenzoate; 2-di-n-butylaminoethyl 4-amino-2-benzyloxybenzoate; 2-(1-pyrrolidyl)-ethyl 4-amino-2-benzyloxybenzoate; 3-(2-methyl-1-pyrrolidyl)propyl 4-amino-2-benzyloxybenzoate; and 2-(2,5-dimethyl-1-pyrrolidyl)-ethyl 4-amino-2-benzyloxybenzoate.

The above-described tertiary-aminoalkyl 4-amino-2-benzyloxybenzoates are readily debenzylated by catalytic reduction to form the corresponding tertiary-aminoalkyl 4-amino-2-hydroxybenzoates, which have been described hereinabove under Section 2. Illustrative of this procedure is the following preparation of 3-(1-piperidyl)propyl 4-amino-2-hydroxybenzoate: A mixture of 30 g. of 3-(1-piperidyl)propyl 4-amino-2-benzyloxybenzoate, 25 ml. of concentrated hydrochloric acid, 20 ml. of water, 100 ml. of 95% ethanol and 2 g. of a 7% palladium chloride-on-charcoal catalyst was shaken with hydrogen at 45° C. and 50 lbs. pressure until the hydrogen absorption ceased (twenty to thirty minutes). The mixture was filtered through a funnel precoated with diatomaceous earth and the filter-pad was washed with ethanol. The combined filtrates were neutralized with sodium bicarbonate and the alcohol was removed in vacuo. The residue crystallized on cooling, giving a quantitative yield of 3-(1-piperidyl)propyl 4-amino-2-hydroxybenzoate, M. P. 57.5–58.5° C. (corr.). From the base can be prepared the hydrochloride or the phosphate, identical with those hereinabove described.

An alternative procedure is embodied in the direct conversion of 2-dimethylaminoethyl 4-nitro-2-benzyloxybenzoate to 2-dimethylaminoethyl 4-amino-2-hydroxybenzoate: A mixture of 31.3 g. of 2-dimethylaminoethyl 4-nitro-2-benzyloxybenzoate hydrochloride, 12.5 ml. of concentrated hydrochloric acid, 20 ml. of water, 100 ml. of ethanol and 4 g. of a 7% palladium chloride-on-charcoal catalyst was shaken with hydrogen, initially at room temperature and 50 lbs. pressure, and finally at 45° C. and 50 lbs. pressure. The reduction proceded rapidly. The catalyst was removed by filtration and the resulting filtrate was processed as described above to give 2-dimethylaminoethyl 4-amino-2-hydroxybenzoate, M. P. 136–137.2° C. (corr.). From this base may be prepared water-soluble salts identical with those hereinabove described.

In the foregoing reductive debenzylating procedures the palladium catalyst, which we found to be preferable, can be replaced by other catalysts such as platinum, Raney nickel, etc. Platinum is slightly less effective than palladium, and Raney nickel can be used only with higher temperatures and pressures.

Other tertiary-aminoalkyl 4-amino-2-hydroxybenzoates which can be prepared according to the above procedures are disclosed hereinabove under Section 2.

This application is a division of our copending application, Serial No. 168,841, filed June 17, 1950.

We claim:

1. A member of the group consisting of basic ester having the formula

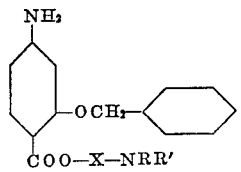

where NRR' is a radical selected from the group consisting of lower dialkylamino, 1-piperidyl, (lower alkylated)-1-piperidyl, 1-pyrrolidyl, (lower alkylated)-1-pyrrolidyl and 4-morpholinyl and X is a lower alkylene radical having 2–4 carbon atoms, and acid-addition salts thereof.

2. A basic ester having the formula where X is a lower alkylene radical having 2–4 carbon atoms.

3. A basic ester having the formula where X is a lower alkylene radical having 2–4 carbon atoms and NRR' is a 1-piperidyl radical.

4. 2-dimethylaminoethyl 4-amino-2-benzyloxybenzoate.

5. 2-diethylaminoethyl 4-amino-2-benzyloxybenzoate.

6. 3-diethylaminopropyl 4-amino-2-benzyloxybenzoate.

7. A process of preparing a basic ester having the formula where NRR' is a radical selected from the group consisting of lower dialkylamino, 1-piperidyl, (lower alkylated)-1-piperidyl, 1-pyrrolidyl, (lower alkylated)-1-pyrrolidyl and 4-morpholinyl and X is a lower alkylene radical having 2–4 carbon atoms, which comprises catalytically hydrogenating in the presence of a member of the group consisting of palladium, platinum and nickel catalysts the corresponding 2-benzyloxy basic ester having the formula

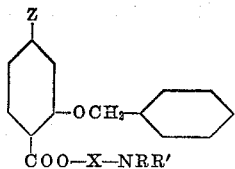

where Z is a member of the group consisting of $NO_2$ and $NH_2$.

8. A process of preparing a basic ester having the formula

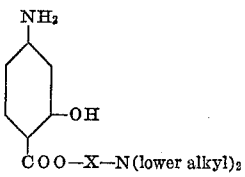

where X is a lower alkylene radical having 2–4 carbon atoms, which comprises catalytically hydrogenating in the presence of a palladium catalyst the corresponding 2-benzyloxy basic ester having the formula

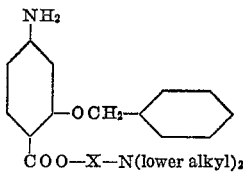

9. A process of preparing a basic ester having the formula

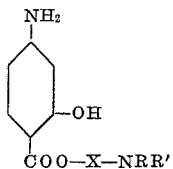

where X is a lower alkylene radical having 2–4 carbon atoms and NRR' is a 1-piperidyl radical, which comprises catalytically hydrogenating in the presence of a palladium catalyst the corresponding 2-benzyloxy basic ester having the formula

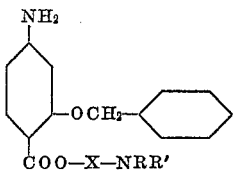

10. A process of preparing 2-dimethylaminoethyl 4-amino-2-hydroxy-benzoate which comprises catalytically hydrogenating 2-dimethylaminoethyl 4-amino-2-benzyloxybenzoate in the presence of a palladium catalyst.

11. A process of preparing 2-diethylaminoethyl 4-amino-2-hydroxy-benzoate which comprises catalytically hydrogenating 2-diethylaminoethyl 4-amino-2-benzyloxybenzoate in the presence of a palladium catalyst.

12. A process of preparing 3-diethylaminopropyl 4-amino-2-hydroxy-benzoate which comprises catalytically hydrogenating 3-diethylaminopropyl 4-amino-2-benzyloxybenzoate in the presence of a palladium catalyst.

13. A basic ester having the formula

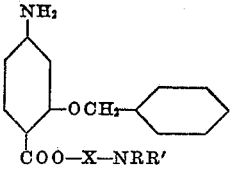

where X is a lower alkylene radical having 2–4 carbon atoms and NRR' is a (lower alkylated)-1-piperidyl radical.

14. A basic ester having the formula

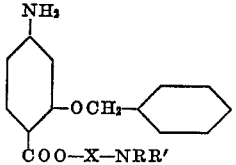

where X is a lower alkylene radical having 2–4 carbon atoms and NRR' is a 2-methyl-1-piperidyl radical.

15. 2-(2-methyl-1-piperidyl)ethyl 4-amino-2-benzyloxybenzoate.

16. 3-(1-piperidyl)propyl 4-amino-2-benzyloxybenzoate.

17. A process of preparing a basic ester having the formula

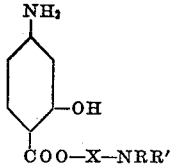

where X is a lower alkylene radical having 2–4 carbon atoms and NRR' is a (lower alkylated)-1-piperidyl radical, which comprises catalytically hydrogenating in the presence of a palladium catalyst the corresponding 2-benzyloxy basic ester having the formula

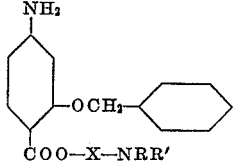

18. A process of preparing a basic ester having the formula

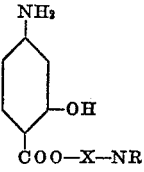

where X is a lower alkylene radical having 2–4 carbon atoms and NRR' is a 2-methyl-1-piperidyl radical, which comprises catalytically hydrogenating in the presence of a palladium catalyst the corresponding 2-benzyloxy basic ester having the formula

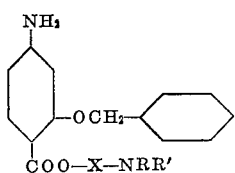

19. A process of preparing 2-(2-methyl-1-piperidyl)ethyl 4-amino-2-hydroxybenzoate which comprises catalytically hydrogenating 2-(2-methyl-1-piperidyl)ethyl 4-amino-2-benzyloxybenzoate in the presence of a palladium catalyst.

20. A process of preparing 3-(1-piperidyl)propyl 4-amino-2-hydroxybenzoate which comprises catalytically hydrogenating 3-(1-piperidyl)propyl 4-amino-2-benzyloxybenzoate in the presence of a palladium catalyst.

RAYMOND O. CLINTON.
STANLEY C. LASKOWSKI.

No references cited.